Oct. 13, 1959  R. W. ILLSLEY  2,908,424
MEASURING AND DISPENSING APPARATUS FOR SEMI-SOLID COMESTIBLES
Filed Sept. 5, 1957 4 Sheets-Sheet 1

INVENTOR:
RALPH W. ILLSLEY
BY
ATT'Y

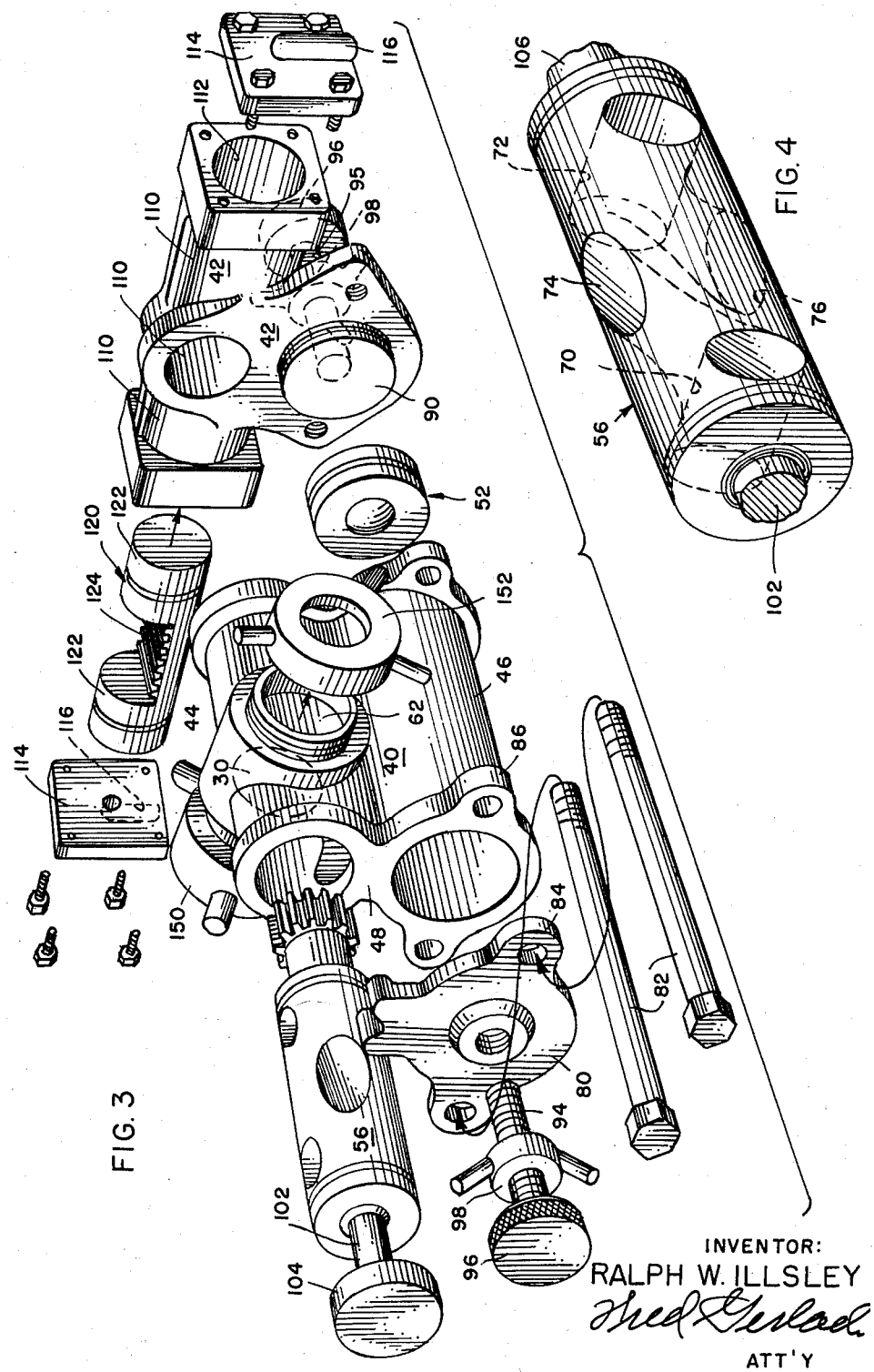
Oct. 13, 1959     R. W. ILLSLEY     2,908,424
MEASURING AND DISPENSING APPARATUS FOR SEMI-SOLID COMESTIBLES
Filed Sept. 5, 1957     4 Sheets-Sheet 2
INVENTOR:
RALPH W. ILLSLEY
ATT'Y Oct. 13, 1959    R. W. ILLSLEY    2,908,424
MEASURING AND DISPENSING APPARATUS FOR SEMI-SOLID COMESTIBLES
Filed Sept. 5, 1957    4 Sheets-Sheet 3

INVENTOR:
RALPH W. ILLSLEY
BY Fred Gerlach
ATT'Y

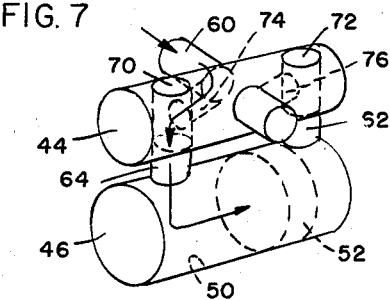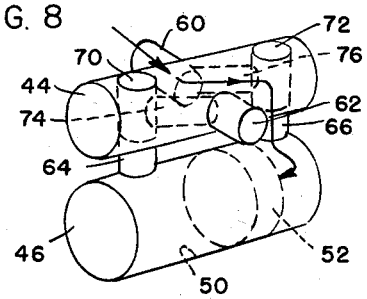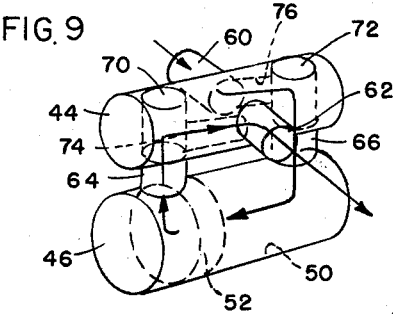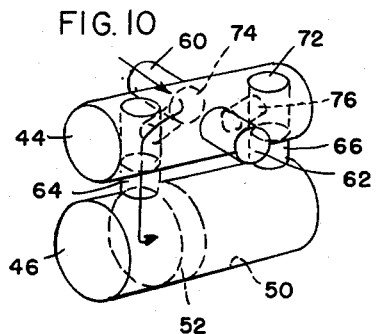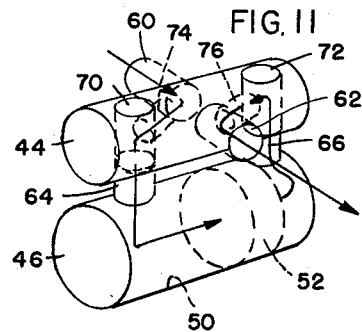

United States Patent Office 2,908,424
Patented Oct. 13, 1959

2,908,424

MEASURING AND DISPENSING APPARATUS FOR SEMI-SOLID COMESTIBLES

Ralph W. Illsley, Chicago, Ill., assignor to The Allbright-Nell Co., Chicago, Ill., a corporation of Illinois Application September 5, 1957, Serial No. 682,110

3 Claims. (Cl. 222—250)

The improved measuring and dispensing machine comprising the present invention has been designed for use primarily in connection with the packaging of bulk sausage meat whereby measured quantities of the bulk material are introduced into appropriate containers as for example paper-lined waxed cardboard cartons. The invention is, however, capable of other uses and measuring and dispensing machines constructed in accordance with the principles of the invention may be employed in connection with the dispensing of other semi-solid comestibles such as cheese, mayonnaise, lard, salad dressings, butter, margarine, peanut butter, jellies, spreads, and a wide variety of other semi-solid products whether they be of a comestible nature or otherwise. Irrespective, however, of the particular use to which the invention may be put, the essential features of the same are at all times preserved.

It is among the principal objects of the present invention to provide a novel measuring and dispensing apparatus for semi-solid products having a measuring chamber into which the product is introduced solely under the influence of the pressure maintained within the product itself, and from which chambers the product is discharged entirely under the influence of such internal pressure.

Another and equally important object of the invention is to provide an apparatus of this sort wherein the material under dispensing enters the measuring chamber through a sinile inlet port and is discharged from said measuring chamber through a single discharge port, the material moving through the apparatus from inlet to discharge without retracing any portions of its path of travel.

It is a further object of the invention, in an apparatus of this character, to provide a novel and extremely simple manual means whereby the effective volume of the measuring chamber may be varied so that the unitary and equal quantities of the substance being successively discharged from the apparatus may be minutely or widely varied without necessitating stopping the operation of the machine or in any way interfering with its normal working.

Yet another object of the invention, is an apparatus of the character briefly described above, is to provide such a measuring and dispensing mechanism wherein the measuring chamber, in effect, fills and empties itself automatically under the control of a single oscillatory valve which is movable alternately between two extreme positions, each movement of the valve automatically effecting discharge of a measured quantity of the product from the machine, the valve itself being operable under the control of an air motor the operation of which, in turn, is effected by manipulation of a two-way actuating valve, this latter valve constituting the sole actuating means for the dispensing apparatus as a whole.

Another object of the invention is to provide a measuring and dispensing apparatus of this sort wherein the air under pressure which is utilized for manipulation of the air motor is effectively isolated from the pressurized product undergoing dispensing and contained within the various passages provided for it within the apparatus so that there will be no entrainment of air by the product, thus insuring delivery of a "solid pack" of the product at each discharge operation.

In carrying out the above mentioned objects, briefly, the invention contemplates the provision of a measuring cylinder or chamber in whihc there is mounted a floating piston which operates between two ports disposed adjacent the ends of the cylinder. Each port communicates through a valve structure with a single product inlet and a single product outlet. The valve structure is provided with two passages therein which are isolated, each from the other, and which passages are arranged, in one position of the valve, so that as one of them is in communication with the product inlet and one of the cylinder ports, the other one is in communication with the product outlet and the other cylinder port. The passages are also so arranged that, in the other position of the valve, the product inlet is connected to the second mentioned cylinder port while the product outlet is connected to the first mentioned cylinder port. Stated more briefly, the passages are so arranged that as the valve is shifted between the two extreme positions of which it is capable, the product inlet and product outlet are alternately connected to the two cylinder ports respectively with the attendant result that, in any given position of the valve, the pressure of the substance entering one cylinder port through one of the valve passages will move the piston toward the other port, while at the same time ejecting through that port and the other passage the substance which, during the preceding stroke of the piston, had entered that port through that passage. The valve is movable between its two extreme positions by rotation thereof through an angle of 180°, and, according to the present invention, such shifting of the valve may be effected by intermittent rotation of the valve in the same direction or by oscillation thereof in opposite directions. For purposes of illustration herein and for convenience of manipulative control, the valve is shown as being of an oscillatory nature under the control of an air motor which drives a rack associated with a pinion carried on the valve element per se. The air motor is operable under the control of a suitable two-way valve which may be either hand, foot or knee operated, the former method of operation being illustrated herein for exemplary purposes.

A provision of a measuring and dispensing apparatus for semi-solid comestibles which is extremely simple in its construction and which therefore may be manufactured at a low cost; one which is comprised of a minimum number of parts, particularly moving parts, and which therefore is unlikely to get out of order; one which is rugged and durable and which therefore will withstand rough usage and is possessed of a relatively long life; one which is capable of ease of assembly and disassembly for purposes of inspection, replacement of parts, or repair; one which provides for free and easy passage of the product through the apparatus from the inlet port to the discharge port and which therefore will not become clogged; and one which otherwise is well adapted to perform the services required of it, are further desirable features which have been borne in mind in the production and development of the present invention.

Numerous other objects and advantages of the invention, not at this time enumerated, will become more readily apparent as the nature of the invention is better understood.

In the accompanying four sheets of drawings forming a part of this specification a preferred embodiment of the invention has been shown.

In these drawings:

Fig. 3 is an exploded view of the apparatus.

Fig. 4 is an enlarged detail perspective view of a valve element employed in connection with the present invention.

Figure 1:
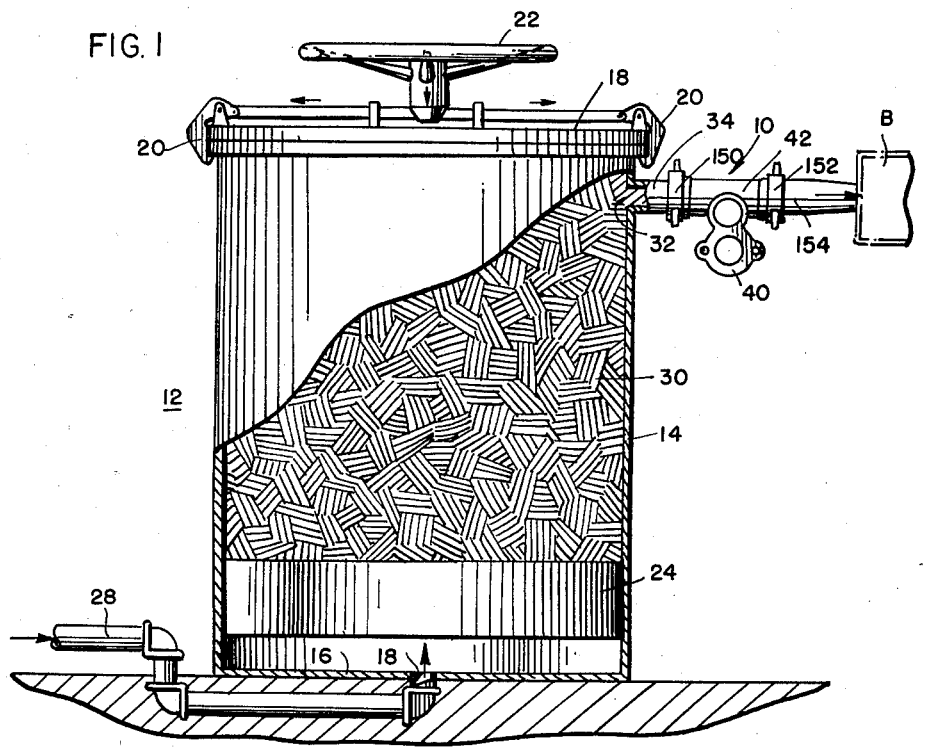
Fig. 1 is a side elevational view, partly in section, showing the improved measuring and dispensing apparatus comprising the present invention operatively associated with a conventional sausage meat stuffing machine.

Referring now to the drawing in detail and in particular to Fig. 1, the improved measuring and dispensing apparatus of the present invention is designated in its entirety at 10 and is shown as being operatively applied to a conventional sausage meat stuffing apparatus 12, by means of which a large quantity of the sausage meat in bulk is maintained under relatively high pressure. The apparatus 12 which will hereinafter be referred to as the stuffer forms no part of the present invention and the present machine 10 may be operatively associated with various types of such stuffers. The particular stuffer selected for illustration here is in the form of a relatively massive cylinder 14 which is closed at its lower end by a bottom wall 16. The upper end of the cylinder 14 is open and is adapted to be closed by means of a suitable cover plate 18 have associated therewith a series of circumferentially spaced clamping devices 20, operable under the control of a hand wheel 22 for drawing the clamping devices taut and maintaining the cover plate 18 in sealing relationship over the upper end of the cylinder 14. A freely floating piston 24 is slidable within the cylinder 14 and normally rests on the bottom wall 16 thereof. The bottom wall 16 is formed with an air inlet 26 which communicates with an air conduit 28 whereby air under pressure may be introduced into the cylinder 14 beneath the piston 24 to raise the piston and place the sausage meat 30 or other semi-solid comestible contained within the cylinder 14 under pressure.

The sausage meat or other comestible is introduced into the cylinder 14 through the open end thereof. Thereafter, the cover plate 18 is replaced on the cylinder 14 and tightened by means of a hand wheel 22, after which air is introduced into the cylinder 14 beneath the piston 24 through the conduit 28 so that the resultant elevation of the piston 24 will place the product under a relatively high pressure. The cylinder 14 is provided in its upper regions with one or more discharge outlets 32, each of which may be connected to a relatively short stuffer cock 34. The stuffer cock 34 shown in Fig. 1 is operatively connected to the measuring and filling device of the present invention and it constitutes the sole support for this latter device.

Figure 2:
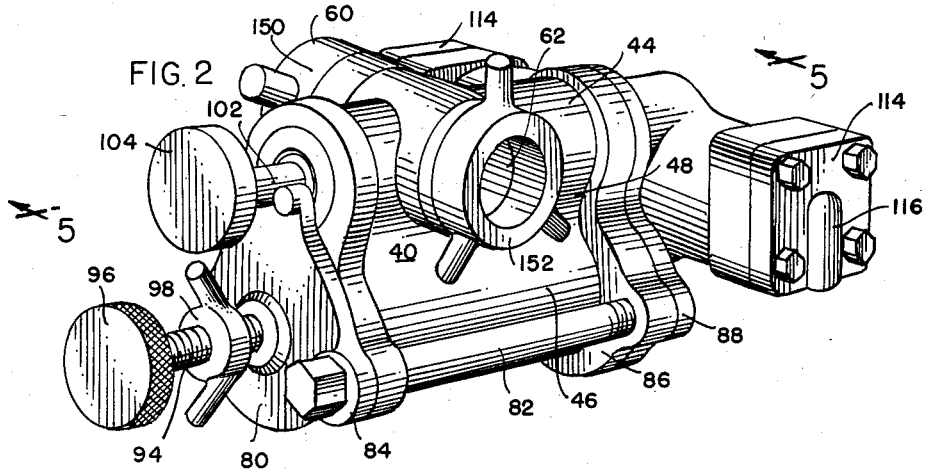
Fig. 2 is a perspective view of the measuring and dispensing apparatus.

Referring now to Figs. 2, 3 and 4, the improved measuring and dispensing apparatus of the present invention involves in its general organization two principal castings, including a combined measuring cylinder and valve casting 40 and an air cylinder casting 42. The casting 40 includes an upper generally cylindrical part 44 and a lower generally cylindrical part 46, the two parts being connected together by a medial solid web portion 48. The part 46 is provided with a cylindrical bore 50 which constitutes a measuring chamber and which has slidable therein a floating piston 52 the nature and function of which will be set forth presently. The upper part 44 of the casting 40 is provided with an internal bore 54 which constitutes a valve chamber within which there is rotatably disposed a valve element or body 56 (Fig. 4) the nature and function of which will likewise be set forth subsequently.

The valve chamber 54 is provided with an inlet opening 60 for the semi-solid sausage meat product and this opening will hereinafter be referred to as the product inlet. The chamber 54 is also provided with an outlet opening 62 for the product, the product inlet 60 and product outlet 62 being disposed on opposite sides of the cylinder 54 in the medial regions thereof in direct opposition to each other. The chamber 54 is also provided with a pair of ports 64 and 66 adjacent its ends establishing communication between the valve and measuring chambers 54 and 50 respectively.

The valve body 56 is of cylindrical design and fits snugly within the wall of the valve chamber 54. As best seen in Fig. 4, the valve body is provided with a pair of transverse passages 70 and 72 therein in transverse alignment with the ports 64 and 66 respectively each of these passages extending through the web portion 48 of the casting 40 (see Fig. 5) and being designed for alternate ingress and egress of the product to and from the measuring chamber 50 upon successive strokes of the piston 52 in a manner that will be made clear presently. The passage 70 communicates with an inclined passage 74, the open exposed end of which is in transverse alignment with the product inlet 60 and product outlet 62. The passage 72 similarly communicates with an inclined passage 76, the open exposed end of which is also in transverse alignment with the product inlet 60 and the product outlet 62, the two inclined passages 74 and 76 intersecting the cylindrical surface of the valve body 56 at diametrically opposed regions as best seen in Fig. 4. The communicating passages 70, 74 and 72, 76 constitute in effect a pair of T-shaped passages in the valve body 56 which are out of communication with each other, one of these T-shaped passages serving one end of the measuring chamber 50 and the other T-shaped passage serving the other end of the measuring chamber.

Figure 5:
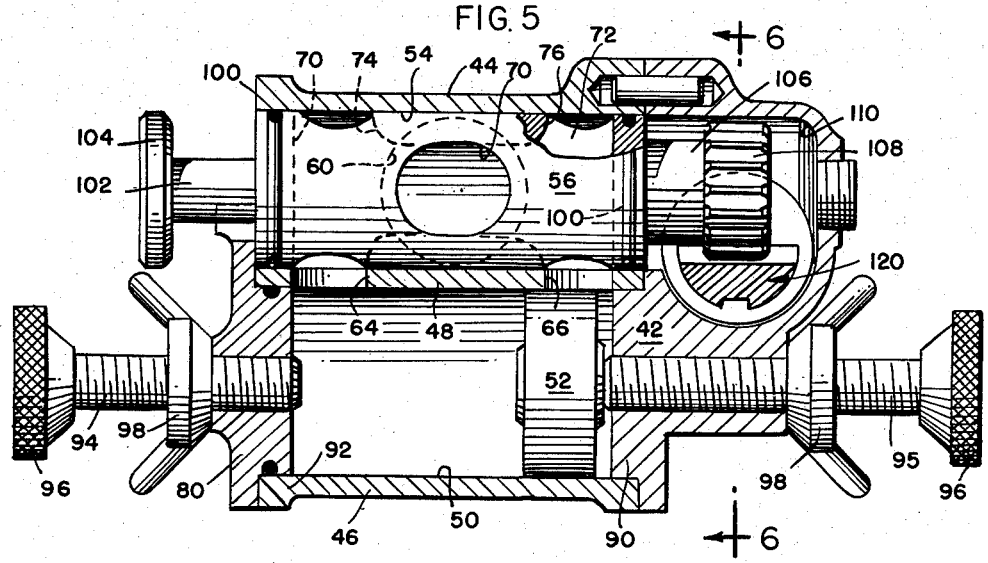
Fig. 5 is a vertical sectional view taken substantially on the plane indicated by the lines 5—5 of Fig. 2.

The valve body 56 is movable between two operative positions throughout an angle of 180°. In the position of the valve body shown in Fig. 5, and schematically shown in Fig. 7, the passage 74, 70 establishes communication between the product inlet 60 and the port 64 so that when the valve body is in this position the product which is under relatively high pressure may flow from the product inlet 60, through the passage 74, 70, and port 64 into the measuring chamber 50 and enter the latter on the left hand side of the piston 52 as seen in Fig. 5 so as to force the piston 52 to the right to the limit of its stroke. At the same time, with the valve body 56 in this position, the passage 76, 72 establishes communication between the measuring chamber 50 and the product outlet 62 so that during such movement of the piston 52, the product which previously existed within the measuring chamber 50 on the right hand side of the piston will be ejected through the port 66, passage 76, 72 and product outlet 62.

The maximum capacity of product delivery from the present apparatus is, of course, a function of the size of the measuring chamber 50 and it is deemed appropriate that, in a commercial machine constructed in accordance with the principles of this invention, a capacity of approximately eighteen ounces will suffice. Means are provided whereby the amount of product discharged from the machine at each stroke of the piston 52 may be regulated within wide limits so that, for example, in a commercial machine, delivery may be regulated between three and eighteen ounces. Accordingly, the left hand end of the cylinder 50 as seen Fig. 5 is adapted to be closed by means of a closure cap 80 (see also Figs. 2 and 3) which is held in position over the end of the cylinder by means of tie rods 82 which project through ears 84 formed on the closure cap 80, and also project through similar ears 86 formed on the adjacent flanged end of the casting 40. The ends of the tie rods 82 are threadedly received in ears 88 formed on the flanged end of the casting 42, the latter casting being formed with a circular protuberance 90 which extends into and sealingly closes the right hand end of the cylinder 50 as seen in Figs. 3 and 5. The closure cap 80 is formed with a similar circular protuberance 92 which extends into the other end of the cylinder 50 and sealingly closes the same. A pair of axially aligned limit stop members in the form of threaded bolts 94 and 95 respectively extend through the closure cap 80 and casting 42 respectively and are provided with knurled actuating heads 96 by means of which the extent of their axial projection into the cylinder or measuring chamber 50 may be manually regulated. Spanner type lock nuts 98 threadedly received on the bolts 94 serve to retain the latter in any desired position of adjustment. It will be seen that by adjusting the position of the limit stop members 94, the stroke of the piston 52, and consequently the amount of the semi-solid product which it is capable of displacing during each stroke thereof may be regulated within fine limits.

Referring now to Figs. 3 and 5, the ends of the valve body 56 are sealed as at 100 by means of O-rings within the valve chamber 54 and the left hand end of the valve body as viewed in Fig. 5 is formed with an extension 102 having a knob 104 formed on its outer end. The knob 104 facilitates initial assembly and adjustment of the valve body in the apparatus as well as removal of the valve body therefrom during disassembly operations. The right hand end of the valve body 56 is formed with an extension 106 having a pinion 108 integrally formed thereon, the extension 106 and pinion 108 extending into a chamber 110 provided in the casting 42. The casting 42 is provided with a transversely extending cylindrical portion 110 (Figs. 3, 5 and 6) having a bore or cylinder 112 therein the ends of which are adapted to be closed by means of closure caps 114. Each closure cap 114 is formed with an L-shaped passage 116 therein through which passages air under pressure may be admitted to the opposite ends of the cylinder 112.

Figure 6:
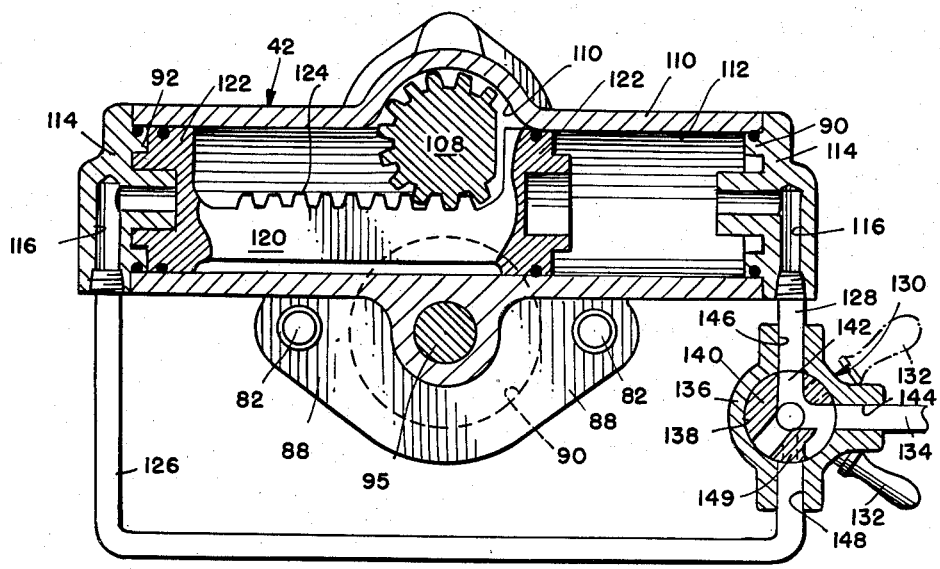
Fig. 6 is a sectional view taken substantially along the line 6—6 of Fig. 5, and Figs. 7, 8, 9, 10 and 11 are schematic views illustrating various positions which the valve and piston mechanisms of the present apparatus are capable of assuming.

Slidingly disposed within the cylinder 112 is an elongated piston and rack unit 120 having spaced piston portions 122 between which there extends a toothed rack portion 124, the latter meshing with the previously mentioned pinion 108. The piston and rack unit 120 is movable between two extreme positions corresponding to the two extreme positions of the rotatable valve body 56 and thus, when the rack is in the extreme position in which it is shown in Figs. 5 and 6, the valve body 56 will assume a position wherein the passage 74, 70 is in communication with the product inlet 60 and the port 64. When the rack is in its other extreme position, the valve body will assume a position wherein the passage 72, 76 is in communication with the port 66 and product outlet 62. The passages 116 are operatively connected by conduits 126 and 128 through a two-way manually operable valve assembly 130 having an operating handle 132 associated therewith to an air supply line 134 leading from a source of air (not shown) under pressure. The valve assembly 130 is of conventional design and includes a valve body 136 providing a valve chamber 138 within which there is rotatably disposed a valve body 140 formed with a Y-shaped passage 142 therein. The valve chamber 138 is provided with an air inlet 144 in communication with the air supply line 134 and with a pair of air outlets 146 and 148 in communication with the conduits 128 and 127 respectively leading to the opposite ends of the cylinder 112. When the handle is in the full line position in which it is shown in Fig. 6, the passage 142 establishes communication between the ports 144 and 146 to admit air to the right hand end of the cylinder 112 and, when the handle is in its dotted line position, the passage 142 establishes communication with the ports 134 and 148 to admit air to the left hand end of the cylinder 112, and, when the handle is in its dotted line position, the passage 142 establishes communication with the ports 134 and 148 to admit air to the left hand end of the cylinder 112. The valve body 140 is formed with suitable exhaust passages 149 for bleeding the ends of the air cylinder 112. As previously stated, the control valve 130 is conventional and no claim is made herein to any novelty associated with the same. Furthermore, the use of such a control valve is optional and, if desired, a pedal operated control device may be substituted therefor.

Referring now to Figs. 2 and 3, the product inlet 60 is provided with a spanner type inlet fitting 150 by means of which the inlet may be operatively connected to the stuffer cock 34 (Fig. 1). The product outlet 60 is provided with a similar spanner type outlet fitting 152 for releasably maintaining a suitable stuffing horn or filling tube 154 in position on the apparatus in register with the product outlet.

Referring now to Fig. 1, in conjunction with Figs. 7 to 11 inclusive wherein the operation of the measuring and dispensing apparatus 10 is schematically illustrated, if it is assumed that at the commencement of machine operations the floating piston 52 is in its right hand position as shown in Figs. 5 and 7, there will be a direct communication between the product inlet 60 and the port 64 through the T-shaped passage 74, 70 so that a solid wall of the product under high internal pressure will fill the passage and measuring chamber 50 and maintain the piston against the inner end of the limit stop 95. Upon movement of the handle 132 (Fig. 6) to its dotted line position, air from the supply line 134 will pass through the passage 142, port 148, conduit 126 and passage 116 so as to enter the cylinder 112 and cause the piston and rack unit 120 to be moved to the right as seen in Fig. 6, whereupon the valve body 56 will, through the medium of the rack and pinion 124, 108 be rotated throughout an angle of 180° and assume the position wherein it is shown in Fig. 8.

In this position of the valve body 56, the T-shaped passage 74, 70 will move out of register with the product inlet 60 and into register with the product outlet 62 while at the same time the transverse portion of this T-shaped passage will become turned end-to-end and remain in register with the port 64. Similarly, the T-shaped passage 72, 76 will move out of register with the product outlet 62 and into register with the product inlet 60 while the transverse portion thereof will become turned end-to-end and remain in register with the port 66. Communication will thus be established between the product inlet 60 and port 66 so that the product under high pressure will force its way through the inlet 60, T-shaped passage 72, 76, port 66 and enter the measuring chamber 50 at the right hand side of the piston 52 so as to force the piston to the left as shown in Fig. 9 and into contact with the limit stop 94. The product which fills the measuring chamber 50 at the left hand side of the piston will thus be expelled from the chamber through the port 64 and be forced through the T-shaped passage 70, 74, product outlet 62 and filling horn 154. The product will issue from the end of the filling horn 154 with considerable pressure and velocity so that it may be forcibly projected into a suitable container such as a paper-lined wax cardboard carton or box B such as has been shown in Fig. 1 and which may be either manually or automatically brought into register with the filling horn 154.

Upon turning of the control valve handle 132 to its full line position as shown in Fig. 6, air will pass from the supply conduit 134 through the Y-shaped passage 142, conduit 128 and passage 116 and enter the cylinder 112 at the right hand side of the piston and rack unit 120, thus shifting the position of the rack and causing the valve body 56 to be reversed or rotated throughout an angle of 180° so that it will assume the position wherein it is shown in Fig. 10. Communication will then be established between the product inlet 60 and port 64 through the T-shaped passage 74, 70 so that the product will flow into the cylinder or measuring chamber 50 at the left hand side of the piston 52, thus moving the piston to the right and into contact with the limit stop 95 as shown in Fig. 11. During such movement of the piston 52, the measuring chamber 50 will become filled with the product while the product previously existing within the chamber at the right hand side of the piston will be expelled through the port 66, T-shaped passage 72, 76 product outlet 62 and filling horn 154 where it may be discharged into a succeeding box or carton B.

For purposes of description herein, it may be considered that the steps described above in connection with Figs. 7 to 11 inclusive constitute a complete machine during which the control handle 132 is twice shifted so that two measuring and filling operations involving the filling of two successive cartons or boxes B are effected.

The operation of the machine is continuous, the operator merely manipulating the control valve handle 132 between its two operative positions while at the same time performing the function of aligning the successive cartons or boxes B with the filling horn 154.

It should be noted that when it is desired to vary the capacity of the measuring chamber 50 to accommodate the filling of cartons or boxes of varying size, it is merely necessary to adjust one or both of the two limit stops 94 and 95, movement of the stops away from each other serving to effect an increase in capacity and movement of these stops toward each other serving to effect a decrease in capacity. Such adjustments may readily be effected by the operator without necessitating stopping the operation of the machine or otherwise interfering with its normal operation.

The invention is not to be limited to the exact arrangement of parts shown in the accompanying drawings or described in this specification as various changes in the details of construction may be resorted to without departing from the spirit of the invention. For example, while the valve member herein illustrated is of the rotary type, it is contemplated that a sliding or reciprocable type valve may be employed if desired. Similarly, although the measuring chamber is described as having a floating piston associated therewith for blocking the direct passage of the product completely through the measuring chamber, it is contemplated that a displaceable diaphragm which extends across the chamber may be employed if desired. Only insofar as the invention has been particularly pointed out in the accompanying claims is the same to be limited.

What is claimed is:

1. In a measuring and dispensing apparatus for semi-solid products, in combination, a casting including upper and lower adjacent parallel enlarged generally cylindrical portions connected together by a narrow vertical web portion, said upper portion providing an internal valve cylinder and said lower portion providing an internal measuring cylinder, said web being formed with two-way passages therethrough extending radially of both cylinders at the opposite ends thereof and establishing communication between adjacent ends of the two cylinders respectively, said valve cylinder being provided with radial medially disposed product inlet and product outlet ports in transverse alignment, a valve body rotatably mounted within said valve cylinder and having a pair of passages formed therein and isolated from each other, said valve body being capable of angular turning movement between one extreme position wherein one of said valve passages establishes communication between the product inlet and one of said two-way passages and the other valve passage establishes communication between the product outlet and the other of said two-way passages and another extreme position wherein said one valve passage establishes communication between said product outlet and said one passage and the other valve passage establishes communication between the product inlet and said other two-way passage, a displaceable member in said measuring chamber between said two-way passages and extending across the chamber for blocking the direct flow of the product between said two-way passages, and means for shifting the position of said valve body angularly between said two extreme positions.

2. In a measuring and dispensing apparatus, the combination set forth in claim 1 wherein said valve body is movable throughout an angle of 180° between its two extreme positions and wherein each of said valve passages is generally of T-shape configuration and includes a diametrically extending bore in transverse alignment with one of said two-way passages and movable into register with said one passage in either extreme position of the valve body, and a communicating bore inclined relative to the longitudinal axis of the valve and movable alternately into register with said product inlet and product outlet ports upon successive shifting movement of said valve body throughout angles of 180°.

3. In a measuring and dispensing apparatus, the combination set forth in claim 1 wherein said radially disposed product inlet and product outlet ports extend in axial alignment in a common horizontal plane, and a carton filling tube operatively connected to and in axial alignment with said product outlet port.

References Cited in the file of this patent

UNITED STATES PATENTS

| | | |
|---|---|---|
| 1,225,699 | Brown | May 8, 1917 |
| 1,804,772 | Hubbard | May 12, 1931 |
| 1,932,976 | Lamb | Oct. 31, 1933 |
| 2,062,181 | Klaus | Nov. 24, 1936 |
| 2,124,073 | Maclean et al. | July 19, 1938 |